(12) United States Patent
Cho (10) Patent No.: US 9,979,944 B2
(45) Date of Patent: May 22, 2018

(54) IMAGE PROCESSING DEVICE AND AUTO WHITE BALANCING METHOD

(71) Applicant: SAMSUNG ELECTRONICS CO., LTD., Suwon-si, Gyeonggi-Do (KR)

(72) Inventor: Juhyun Cho, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 121 days.

(21) Appl. No.: 15/225,904

(22) Filed: Aug. 2, 2016

(65) Prior Publication Data

US 2017/0078636 A1 Mar. 16, 2017

(30) Foreign Application Priority Data

Sep. 10, 2015 (KR) .................. 10-2015-0128483

(51) Int. Cl.
*H04N 9/73* (2006.01)
*H04N 1/60* (2006.01)

(52) U.S. Cl.
CPC .......... *H04N 9/735* (2013.01); *H04N 1/6027* (2013.01)

(58) Field of Classification Search
CPC .................. H04N 9/735; H04N 1/6027
See application file for complete search history.

(56) References Cited

U.S. PATENT DOCUMENTS

| 7,724,982 | B2 | 5/2010 | Hung et al. |
| 7,728,880 | B2 | 6/2010 | Hung et al. |
| 7,912,279 | B2 | 3/2011 | Hsu et al. |
| 7,969,480 | B2 | 6/2011 | Kim et al. |
| 8,064,110 | B2 | 11/2011 | Noyes et al. |
| 8,111,301 | B2 | 2/2012 | Kim et al. |
| 8,611,656 | B2 | 12/2013 | Kim et al. |
| 8,624,996 | B2 | 1/2014 | Mendez |
| 2009/0097745 | A1* | 4/2009 | Kim .................. H04N 9/73 382/167 |
| 2015/0116534 | A1 | 4/2015 | Kim |

FOREIGN PATENT DOCUMENTS

| KR | 10-2006-0089096 A | 8/2006 |
| KR | 10-0999886 B1 | 12/2010 |
| KR | 10-1007693 B1 | 1/2011 |

* cited by examiner

*Primary Examiner* — Christopher K Peterson
(74) *Attorney, Agent, or Firm* — Volentine, Whitt & Francos, PLLC (57) ABSTRACT

An auto white balancing method for image data includes calculating block variances for the image data and selecting blocks having a block variance higher than a block variance value. The method further includes selecting patches included in a gray zone defined at a color space, applying a corresponding block variance as a weight to the patches of the gray zone, adjusting a first mean value at the color space, and selecting first patch candidates belong to a first distribution at a luminance domain from among patches selected with reference to the adjusted first mean value. The method further includes selecting a shrunken gray zone corresponding to an anchor point in the gray zone and selecting second patch candidates having a second distribution at a color space and a luminance domain, from among patches included in the shrunken gray zone, and calculating a final gain for the image data by combining a first RGB gain and a second RGB gain respectively extracted from the first patch candidates and the second patch candidates.

20 Claims, 11 Drawing Sheets

Shrunken Gray Zone

FIG. 11

IMAGE PROCESSING DEVICE AND AUTO WHITE BALANCING METHOD

CROSS-REFERENCE TO RELATED APPLICATIONS

A claim for priority under 35 U.S.C. § 119 is made to Korean Patent Application No. 10-2015-00128483 filed Sep. 10, 2015, the subject matter of which is hereby incorporated by reference.

BACKGROUND

The inventive concept relates to image processing devices, and more particularly, to methods of automatically adjusting white balance in image processing devices.

White balancing is a process of determining that a pixel or a collection of pixels (hereafter, a "patch") selected from an input image is white in color and thereafter adjusting color(s) of the image, wholly or in part, according to one or more gain(s) of a color difference component (i.e., R or B) of the determined pixel or patch. A white patch having a color variance for an imaged object due to an illuminance condition for the image data is applied to adjust a white balance that may vary with a color temperature is determined using a red, green, blue (RGB) ratio of the detected patch (or pixel). Color correction for shifting a total color sense and tuning a color balance is performed by adjusting a gain of a red (R) and a blue (B) of an image according to the color temperature.

Generally, when the same object is imaged (e.g., in a still image) using various kinds of imaging devices such as a digital camera, the color appearance of the image changes in accordance with different illuminance conditions (e.g., a white lighting, fluorescent lighting, sun light, etc.). The human eye possesses a color constancy, such that a human recognizes white color under different luminance conditions. However, an image device may recognize the color of an object based on a RGB component included in different illuminance conditions. For example, when a color temperature of a particular illuminance condition is high, the image device may reproduce "white" including a blue color component of the image. On the other hand, when a color temperature of another luminance condition is low, the image device may reproduce "white" including a red color component of the image.

Accordingly, when a color temperature changes due to an illuminance condition, there is a need to adjust a white balance that correctly renders a white color. For example, a white color including a blue color is adjusted so as to increase a gain of a red (i.e., R) and decrease a gain of a blue (i.e., B). On the other hand, a white color including a blue color is adjusted so as to increase a gain of a red (i.e., R) and decrease a gain of a blue (i.e., B). A white component which is a reference of a white balance is accurately detected to accurately adjust the white balance. However, an auto white balance (AWB) having a complexity and a high cost may be used to accurately detect a white component. Accordingly, there is a need to implement a high-speed and low-power auto white balancing approach such that incorporating devices are suitable for mobile use.

SUMMARY

Embodiments of the inventive concept provide an image processing device and auto white balancing method thereof capable of reducing a cost paid to detect a white component of image data and providing a high accuracy.

According to an embodiment of the inventive concept, an auto white balancing method of image data provided from an image sensor of an image device may include calculating a variation about a plurality of blocks included in the image data and selecting blocks of which the calculated variation is higher than a threshold, selecting patches, which are included in a gray zone defined at a color space, from among patches included in one of the selected blocks, applying the variance as a weight to the patches of the gray zone, adjusting a first mean value at the color space, and selecting first patch candidates, which belong to a first distribution at a luminance domain, from among patches selected with reference to the adjusted first mean value, selecting a shrunken gray zone corresponding to one anchor point at the gray zone and selecting second patch candidates, which have a second distribution at a color space and a luminance domain, from among patches included in the shrunken gray zone, and calculating a final gain about the image data by combining the first RGB gain and the second RGB gain respectively extracted from the first patch candidates and the second patch candidates.

According to an embodiment of the inventive concept, an image processing device may include an image sensor configured to sense an image and to output the sensed image as image data and an image signal processor configured to divide the image data into a plurality of blocks, to select blocks of which a variance about each of blocks at a color space is higher than a threshold, to select patches, which are included in a gray zone defined at the color space, from among patches included in one of the selected blocks, to calculate a first RGB gain by performing a mean shift with respect to patches included in the gray zone at the color space and making a confidence range selection at a luminance domain, and to calculate a second RGB gain by performing the mean shift about patches included in a shrunken gray zone at the color space and making the confidence range selection at the luminance domain. The image signal processor may combine the first RGB gain and the second RGB gain and may provide a final gain as a gain of a color component for an auto white balance of the image data.

According to an embodiment of the inventive concept, an auto white balancing method of image data about an image processing device may include dividing the image data into a plurality of image unit and calculating a variance about each divided image unit at a color space, selecting the image units, each of which a variance exceeds a threshold, from among the image units and selecting image units, which are included in a gray zone, from among the selected image units, selecting first candidate units, which have a first confidence at the color space or at a luminance domain, from among the selected image units, selecting image units, which are included in a shrunken gray zone smaller than the gray zone, from among the first candidate units and selecting second candidate units, which have a second confidence at the color space or at the luminance domain, from among the selected image units. The selecting of the first candidate units and the selecting of the second candidate units may include performing a mean shift operation to which the variance is applied as a weight.

BRIEF DESCRIPTION OF THE DRAWINGS

The above and other objects and features will become apparent from the following description with reference to the following figures, wherein like reference numerals refer to like parts throughout the various figures unless otherwise specified, and wherein.

DETAILED DESCRIPTION

The inventive concept now will be described more fully hereinafter with reference to the accompanying drawings, in which embodiments of the invention are shown. This inventive concept may, however, be embodied in many different forms and should not be construed as limited to only the illustrated embodiments. Rather, these embodiments are provided so that this disclosure will be thorough and complete, and will fully convey the scope of the invention to those skilled in the art. Throughout the written description and drawings, like reference numbers and labels refer to like or similar elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

The following embodiments may be embodied, wholly or in part, by the functionality provided by an image signal processor (ISP). However, those skilled in the art will understand that the exemplary features and methods described hereafter may be variously implemented using hardware and/or software components.

Figure 1:
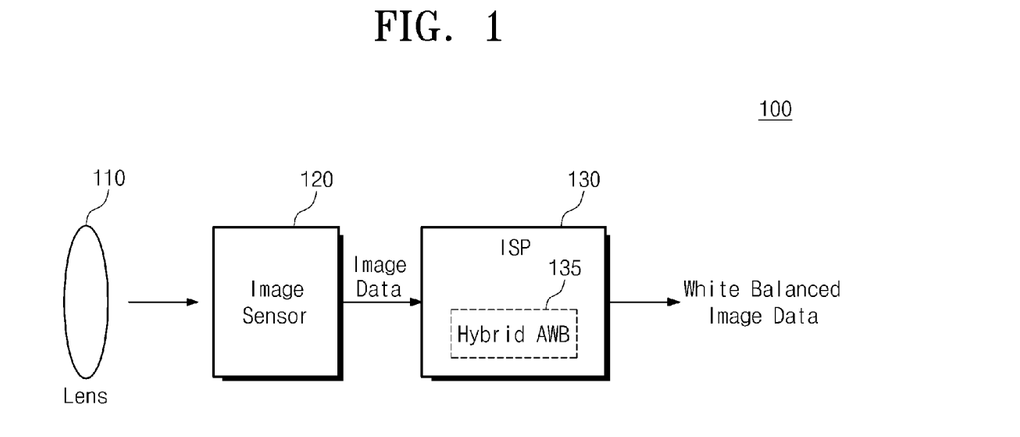
FIG. 1 is a block diagram illustrating an image processing device according to an embodiment of the inventive concept.

Figure (FIG.) 1 is a block diagram illustrating an image processing device 100 according to an embodiment of the inventive concept. Referring to FIG. 1, an image processing device 100 may include a lens 110, an image sensor 120, and an image signal processor (ISP) 130.

The lens 110 may be used to focus an image of an object onto the image sensor 120. The image sensor 120 may sense the received image and convert the sensed image into corresponding digital data. The image sensor 120 may include a plurality of image sensor pixels arranged in a matrix of rows and columns. The image sensor 120 may include a charge coupled device (CCD) or a Complementary Metal Oxide Semiconductor (CMOS) image sensor, such as a Contact Image Sensor (CIS). However, specifically implemented, the image sensor 120 may "image" an object and provide corresponding image data (e.g., Bayer image data). There are different forms of image data variously indicating color and brightness, such as those using red, green and blue (RGB) data and methodologies, YUV data and methodologies, etc.

The image signal processor 130 may receive image data from the image sensor 120, and process the received image data in order to provide white balanced image data. For example, the image signal processor 130 may drive a hybrid auto white balance module 135 in certain embodiments of the inventive concept, where the hybrid auto white balance module 135 is used to calculate a block variance for a color space with respect to a plurality of blocks that constitutes the image. Thereafter, blocks having a variance smaller than a reference variance value may be excluded from blocks selected for the performing of white balancing.

Thus, the image signal processor 130 may select certain patches (e.g., block portions included in a previously designated gray zone) from among the selected blocks. A statistical-based mean shift operation may then be performed with respect to the gray zone patches. That is, some of the patches (e.g., patches included in a luminance Y domain of a specific range) may be further selected using a mean shift operation, and a first RGB gain may be calculated from the selected patches.

Further, the image signal processor 130 may define a shrunken gray zone among patches used to obtain the first RGB gain, may perform a mean shift operation with respect to patches included in the shrunken gray zone. During this process, the image signal processor 130 may select some of the patches included in the luminance domain of a specific range in order to calculate a second RGB gain patches selected from the shrunken gray zone.

The image signal processor 130 may apply a block variance (e.g., a variance calculated before the first RGB gain and second RGB gain are calculated) in order to calculate a final RGB gain that may be used as a weighting factor (or weight). Here, the image signal processor 130 may use the final RGB gain—which may be generated by applying the block variance to the first RGB gain and second RGB gain as a weight—as a control signal to adjust color reproduction and/or brightness of an image. This type of auto white balance operation may be implemented using the hybrid auto white balance module 135 included in the image signal processor 130 of FIG. 1, for example. The hybrid auto white balance module 135 may be implemented in hardware and/or software including firmware.

When the hybrid auto white balance module 135 according to an embodiment of the inventive concept is applied to an image, a color component may be efficiently filtered for different and various illumination environments, thereby increasing the accuracy of the calculation of a white balance. Moreover, an operation to extract an RGB gain may relatively easy and simple, enabling the rapid performance of white balance.

Figure 2:
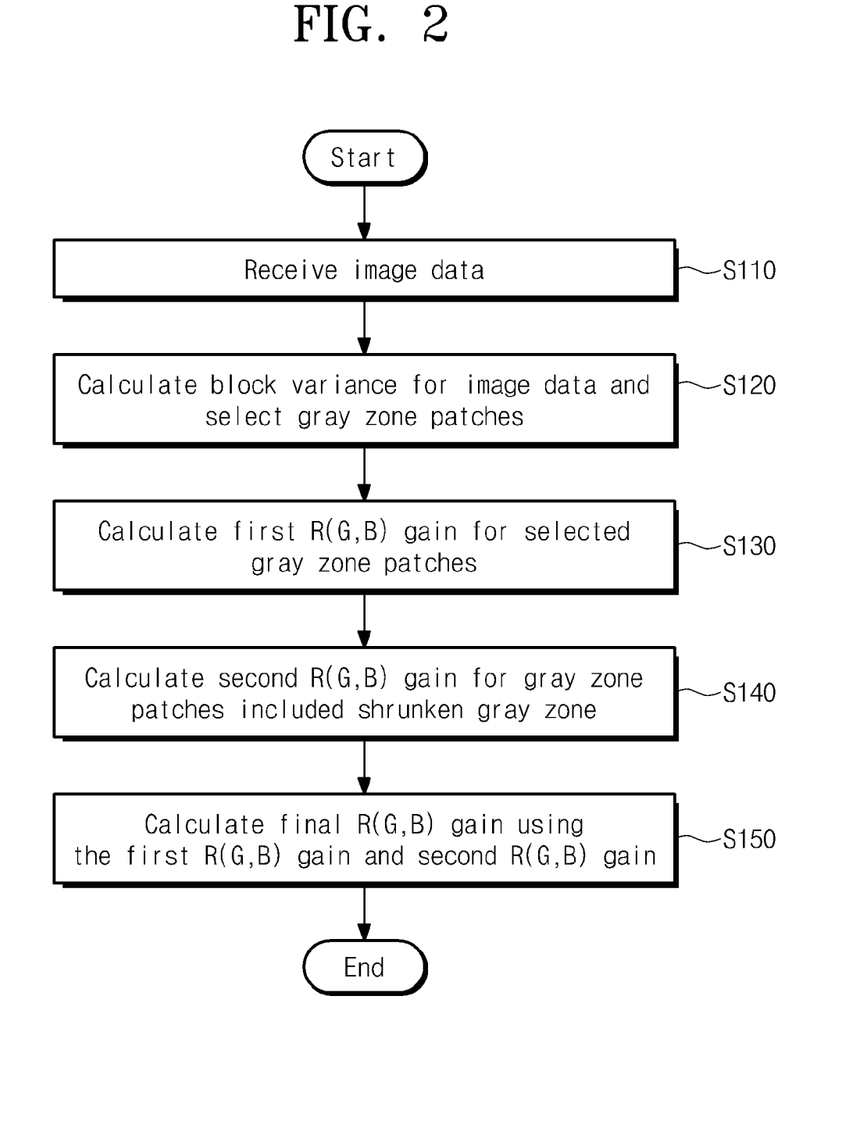
FIG. 2 is a flowchart illustrating a hybrid auto white balancing method according to an embodiment of the inventive concept.

FIG. 2 is a flowchart illustrating a hybrid auto white balancing method according to an embodiment of the inventive concept. Referring to FIG. 2, an optimal white balance may be determined by combining a gray zone determination for a color space and a statistical method, and applying the combination result to received image data.

With reference to FIGS. 1 and 2, the image signal processor 130 receives image data from the image sensor 120 (S110). The image data, as sensed and provided by the image sensor 120, may be a RGB signal or a YUV signal. However, the image data may include certain noise components. For example, distorted color information due to an object having color weight that is relatively great for a color space of an image, or due to a color temperature difference between illumination environments may be included in the image data. Color distortion due to a temperature difference or a dominant color may changed according to the operating state of type of image sensor being used to capture the image.

Upon receipt of the image data, a block variance for the image data may be calculated (S120). In this regard, an image may be divided into a plurality of blocks, where each of the blocks is further divided into a plurality of patches, and each patch includes a plurality of pixels. Each of the patches may be variously characterized by color space information. For example, each patch may be characterized by RGB, YUV, and/or normalized r(b) color space information. Moreover, each block may be characterized by a mean value about the color space information associated with constituent patches. Here, color space information for a block may be included in corresponding block information.

Accordingly, the color space information for a plurality of blocks may be characterized by a mean color space information value associated with the plurality of blocks, including (e.g.,) a total number of blocks included in the image data (hereafter, "total blocks"). Thus, a particular block having a mean value that is relatively close to a mean color space information value for the total blocks may determined to have a dominant color of the image. Accordingly, blocks determined to have the dominant color may be excluded from a group of blocks from which candidate white patch(es) are selected. For example, a block having a block variance ($\sigma^2$) that is less than a reference variance value may be excluded (hereafter, designated as "non-selected blocks"), while blocks having a block variance greater than or equal to the reference variance value may be selected (hereafter, designated as "selected-blocks").

In addition to the calculation of block variance(s) for the image corresponding to the received image data, patches included in a gray zone may be selected from among patches included in the selected blocks. Here, the certain approaches to the definition of a gray zone, as well as possible methods of selecting patches included in the gray zone will be described hereafter.

After calculation of block variance(s) and selection of gray zone patches, a first RGB gain may be calculated using certain statistically-selected gray zone patches (i.e., gray zone patches selected from among patches in the gray zone using a statistical processing approach). At this point, it should be noted that certain gray zone patches may have some type of color component. Accordingly, patches may be selected using a mean shift operation in view of a block variance and an additional selection. Thus, patches having a white component and a confidence greater than or equal to a specific confidence level may be further selected by applying a statistical method in an additional luminance domain to the selected patches. In certain embodiments of the inventive concept, the first RGB gain may be calculated using a normalized r(b) value for patches selected after a statistical selection at the luminance Y domain is made.

The foregoing selection of patches (step S130) may be deemed a "first selection of patches". Additionally, a "second selection of patches" may be made. For example, the additional (or further) selection may be performed with respect to patches already selected in step S130.

Hence, a gray zone smaller than the initial gray zone considered (i.e., a "shrunken gray zone") may be defined. For example, the shrunken gray zone may have an anchor point adjacent to a color average for selected patch candidates. That is, during the step of calculating the first R(G, B) gain (step S130), some of the patch white patch candidates included in the shrunken gray zone from among the selected white patch candidates may be selected, and final patch candidates may be selected using a statistical processing applied to the selected patch candidates at a color space and a statistical processing at the luminance Y domain. In this manner, a second RGB gain may be calculated using the final patch candidates (S140).

Then, a final RGB gain may be calculated by combining the first RGB gain and second RGB gain (S150). For example, the final RGB gain may be a mean value calculated from the first RGB gain and second RGB gain.

In the foregoing embodiment, a hybrid auto white balancing method includes the selecting of a candidate white patch by combinational use of a gray zone selection, a statistical consideration of image data, and at least one calculation of a color space gain for a selected patch. Hence, a gray zone may be rapidly selected, and a mean shift operation in view of a block variance may be applied through a statistical operation applied to selected gray zone patches. The foregoing is one example of an operating method according to embodiments of the inventive concept that provide a calculation approach that is simple and clear, thereby resulting in the provision of a high-speed, auto white balance.

Figure 3:
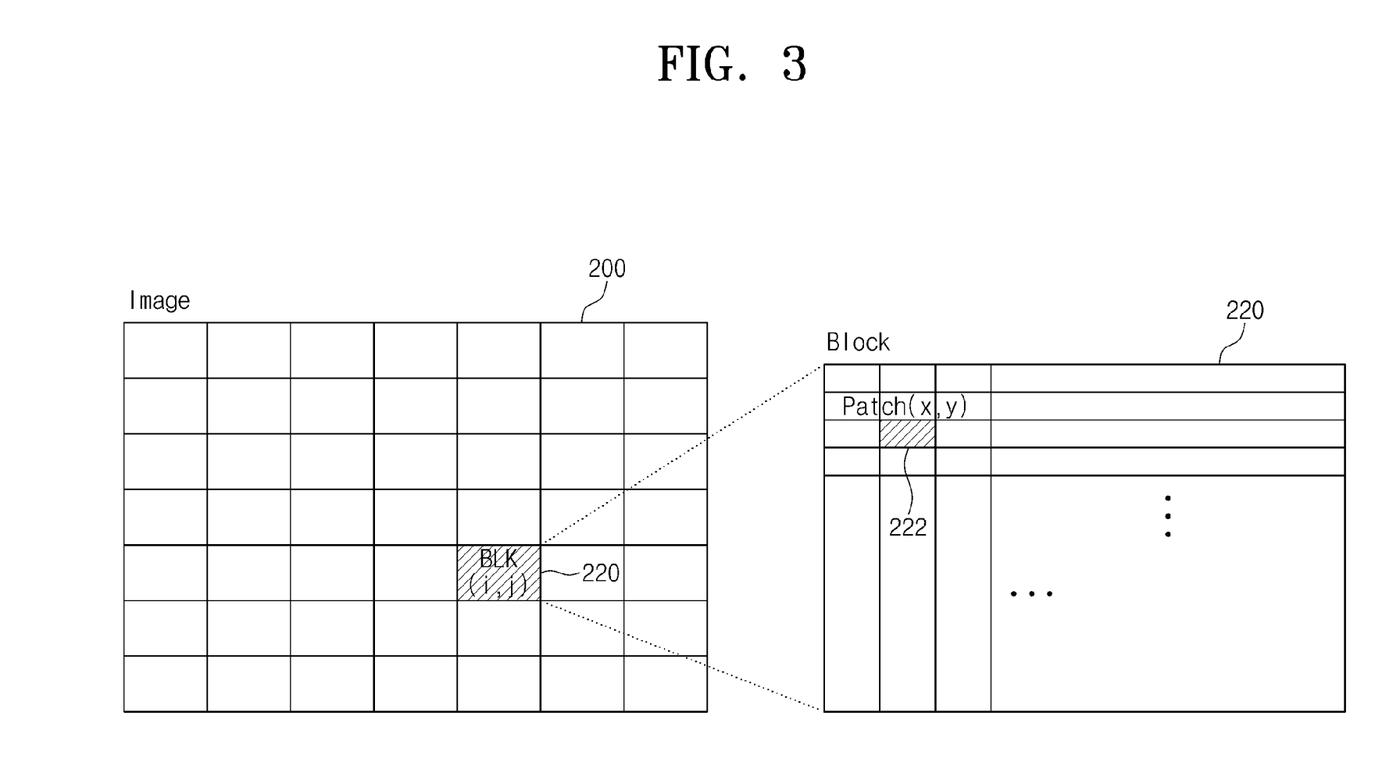
FIG. 3 is a block diagram for describing a definition about a block and a patch of an image described in FIG. 2.

FIG. 3 is a conceptual diagram further illustrating certain steps of the foregoing method described with reference to FIGS. 1 and 2. Here, an image 200 includes a plurality of pixels divided into a plurality of blocks, wherein each block of pixels is further divided into a plurality of patches.

Thus, the image 200 may include information related to different colors and/or luminance displayed on a screen. That is, each pixel in the plurality of pixels may include information indicating a color component and/or a luminance component (e.g. information associated with a RGB method or a YUV method).

As described previously, a block may be used as a unit for the composition of the image 200. The size of the block may be defined to efficiently process and manage image data displayed on the screen. For example, each block may correspond to one tile during image processing performed according to a tile mapping method. For example, an (i, j)-th block 220 selected from among the plurality of blocks shown in FIG. 3 will be described as an example. It should be noted that while FIG. 3 shows an example wherein the image 200 is divided into 49 individual blocks (e.g., 7×7 blocks), the scope of the inventive concept is not limited thereto. In FIG. 3, the (i, j)-th block 220 is further divided into a plurality of patches (e.g., x×y patches), where each patch includes at least one pixel.

A block variance ($\sigma^2$). like the one determined by step S120 in the method of FIG. 2, may be calculated as a measure of variability in mean color space information for the image 200. For example, mean color space information may be calculated for each of the blocks in the image 200 (e.g., using RGB data or YUV data for total blocks (or patches) of the image 200). Here, block variance ($\sigma^2$) may indicate a degree by which a RGB value or a YUV value differs from an image mean value. A block having a relatively high or great block variance ($\sigma^2$) may be regarded as a block having a color that is relatively far from a dominant color or characteristic of the overall image. In contrast, a block having a relatively low or small block variance ($\sigma^2$) may be regarded as a block having a color that corresponds to the dominant color of the image. Accordingly, patches included in a block having a small block variance ($\sigma^2$) may be regarded as patches possibly not having a white component, whereas patches having a large block variance ($\sigma^2$) may be regarded as possibly having a white component. In other words, blocks having relatively large block variance ($\sigma^2$) are more likely to include patches that will subsequently be determined to be white patches.

The number of blocks or patches to which a mean shift operation according to a statistical method of the inventive concept is applied may be reduced through a method of excluding blocks having a block variance ($\sigma^2$) that falls below a variance threshold. Further, in view of the method described in relation to FIG. 2 (e.g., step S150), the final patches may be are selected by considering a corresponding block variance ($\sigma^2$) (e.g., one in which a mean between two final RGB gains is applied as a weight).

Above, an embodiment of the inventive concept includes the use of a block variance ($\sigma^2$) characteristic to determine the variability of color space information for a corresponding block according to a mean value of an image. However, the scope of the inventive concept is not be limited thereto. For example, it is understood that a standard deviation ($\sigma$), a coefficient of variation, and the may be used as measure of color space variability for a corresponding block of an image.

Figure 4:
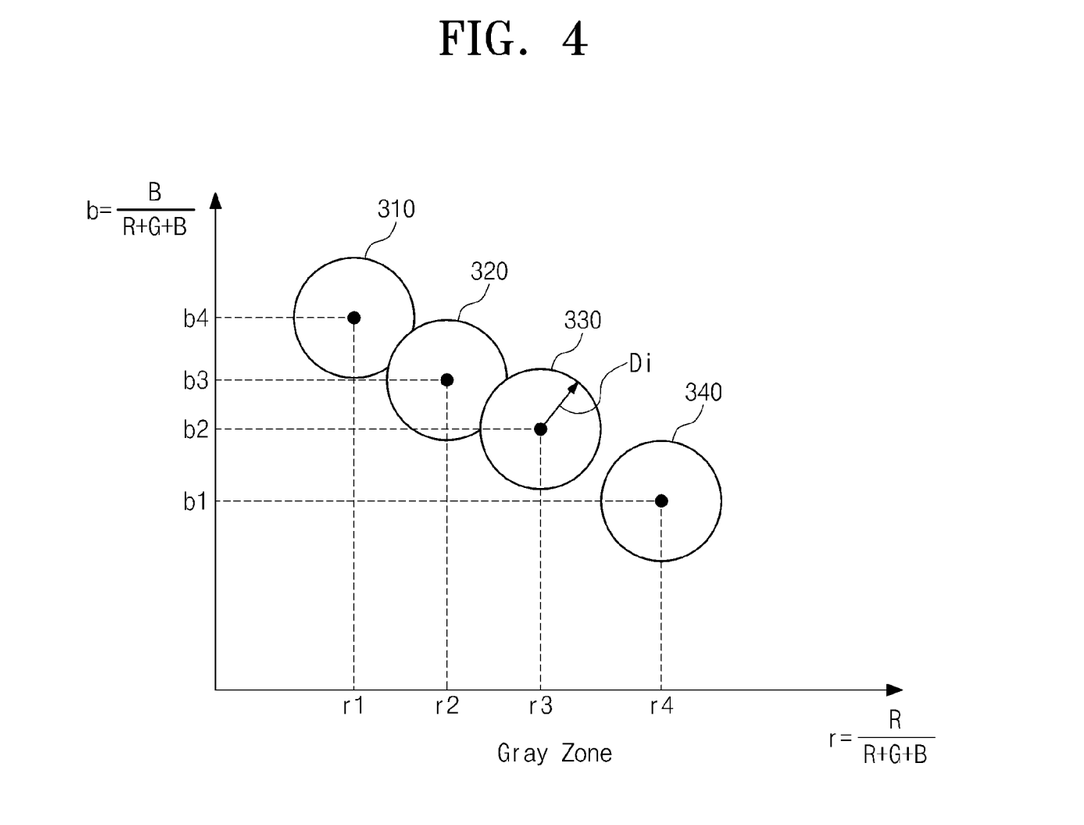
FIG. 4 is a graph for describing a method of selecting a gray zone according to an embodiment of the inventive concept.

FIG. 4 is a graph describing a method of selecting a gray zone that may be used in certain embodiments of the inventive concept. Referring to FIG. 4, a distribution of color information associated with patches is illustrated in an r(b) plane, where 'r' is equal to 'R/(R+B+G)' or 'R/G' and 'b' is 'B/(R+B+G)' or 'B/G' and may be a normalized color space value.

With reference to FIGS. 1 and 4, the image processing device 100 may use patching data which is based on a mean value in a portion of a window (e.g., a block or a patch) about a sampled data without using total data provided by the sensed image. A mean value of a gray zone may be a white point, and thus a gray zone may be selected to extract the white point using the patching data. Moreover, when a color cast occurs due to a particular illumination condition, a ratio between RGB components about the gray colors may change. Accordingly, the white point may be obtained by selecting a gray zone corresponding to an image sensor and using patches included in the gray zone. As illustrated in FIG. 4, the gray zone may be defined at a color space of an r(b) plane.

White pointers identified under various illuminations may be determined to define the gray zone. The gray zone 310 may be determined by an anchor point (r1, b4) and a radius Di. Here, the radius Di may be a value determined according to a color spectrum characteristic of the image sensor 120 at a corresponding color temperature. That is, the gray zone 310 may be a distribution about color components which the image sensor 120 recognizes as a gray color at an illuminant of which the color temperature is relatively high. However, when it is assumed for various illumination conditions, the gray zone may relatively widen.

The gray zone 320 may be determined by an anchor point (r2, b3) and the radius Di. That is, the gray zone 320 may be a distribution about color components which the image sensor 120 recognizes as a gray color for a given illumination condition of which a color temperature is relatively lower than a color temperature of the gray zone 310. The gray zone 330 may be determined by an anchor point (r3, b2) and the radius Di. That is, the gray zone 330 may be a distribution about color components which the image sensor 120 recognizes as a gray color for the illumination condition of which a color temperature is relatively lower than a color temperature of the gray zone 320. The gray zone 340 may be determined by an anchor point (r4, b1) and the radius Di. The gray zone 340 may be a distribution about color components which the image sensor 120 recognizes as a gray color for an illumination condition of which a color temperature is relatively lower than a color temperature of the gray zone 330.

The gray zone for the image sensor 120 with respect to the various illumination conditions may be defined by the gray zones 310, 320, 330, and/or 340. When the gray zone is defined, whether color information for patches of a non-selected block according to its block variance ($\sigma^2$) is included in the gray zone may be detected. Moreover, patches disposed outside the gray zone may be excluded from a determination of white patch candidate(s).

It should be noted that the embodiment illustrated in FIG. 4, assumes the same radius Di for each of the gray zones 310, 320, 330, and 340. However, the scope of the inventive concept may not be limited thereto. For example, it should be understood that a radius, to which a range of each of the gray zones 310, 320, 330, and 340 is limited, is provided as a size specialized in a corresponding color temperature.

Figure 5:
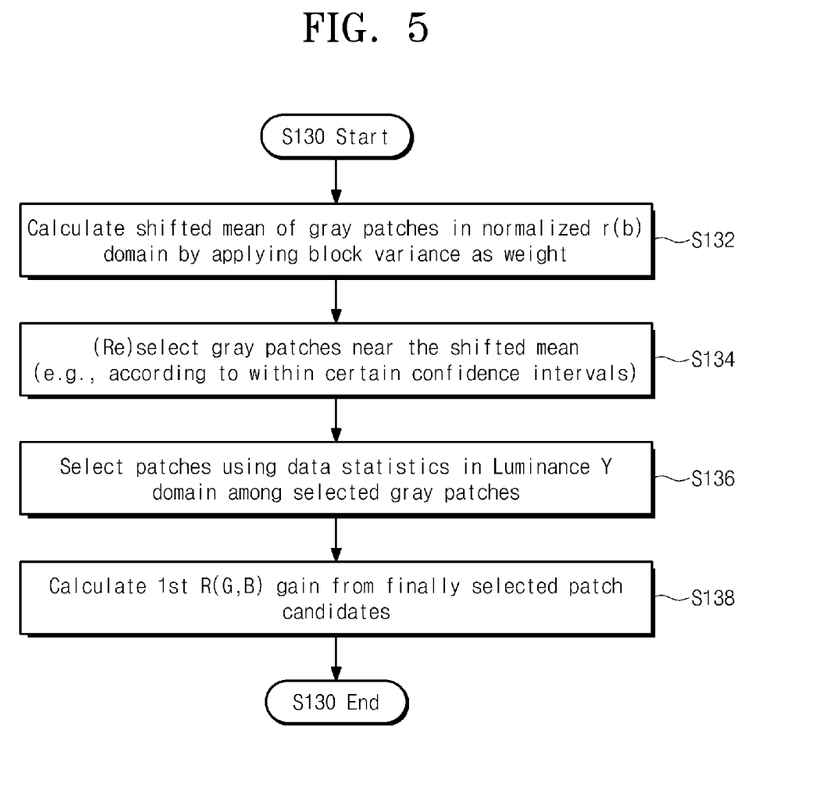
FIG. 5 is a flowchart for describing step S130 of FIG. 5 in more detail.

FIG. 5 is a flowchart further illustrating one example of step S130 from the method previously described with reference to FIG. 2. Referring to FIG. 5, a white point may be extracted by performing a mean shift operation according to a statistical method applied to patches included in the gray zone described in FIG. 4 for a color space, and making a statistical selection for a given luminance Y domain.

Thus, a mean shift operation in view of the block variance ($\sigma^2$) for a normalized color space r(b) coordinate may be performed (S132). A mean value (μ) may exist in the normalized color space associated with patches included in the gray zone. For example, the mean value about each of 'r' (i.e., R/(R+G+B)) component or 'b' (i.e., B/(R+G+B)) component associated with patches included in the gray zone may exist. However, patches affected by the dominant color of an image or a relative size of color in the image may be selected from among patches included in the gray zone. Thus, the patches included in the gray zone may, in fact, be patches including a color. Moreover, patches, which are included in different blocks, from among patches included in the gray zone may exist. Patches may belong to a block having a block variance ($\sigma^2$) that is relatively great, and patches may belong to a block having a block variance ($\sigma^2$) that is relatively small. Accordingly, a mean for patches may be again obtained by applying a higher weight (i.e., a greater weighting factor) to the patches having a great block variance ($\sigma^2$) from among patches included in the gray zone and applying a lesser weight (i.e., a smaller weighting factor) to patches having a small block variance ($\sigma^2$) from among the patches included in the gray zone. The mean calculated by applying the weights may correspond to a shifted mean (μ').

Now, patch candidates based on the shifted mean (μ') may be re-selected (S134). That is, patches corresponding to a confidential (e.g., 95%) interval with the shifted mean (μ') as the center may be selected.

A selection may be made in relation to a luminance Y domain for each of patches (re-)selected at step S134 (S136). Generally, it is understood from a spectrum of the luminance Y that a change in luminance conditions will cause greater changes in a white component than that of a black component. Accordingly, patches having a white component with a mean (μ) at the luminance Y domain as the center may be relatively more selected.

Then, a gain for the auto white balance of a color space may be calculated with reference to the patch candidates selected in accordance with the luminance Y domain (S138). That is, a gain for color components for adjustment may be calculated with reference to mean RGB values about patches selected at step S138 such that a ratio of color components is identically maintained. In certain embodiments of the inventive concept, the calculated gain will be a first RGB gain.

Figure 6:
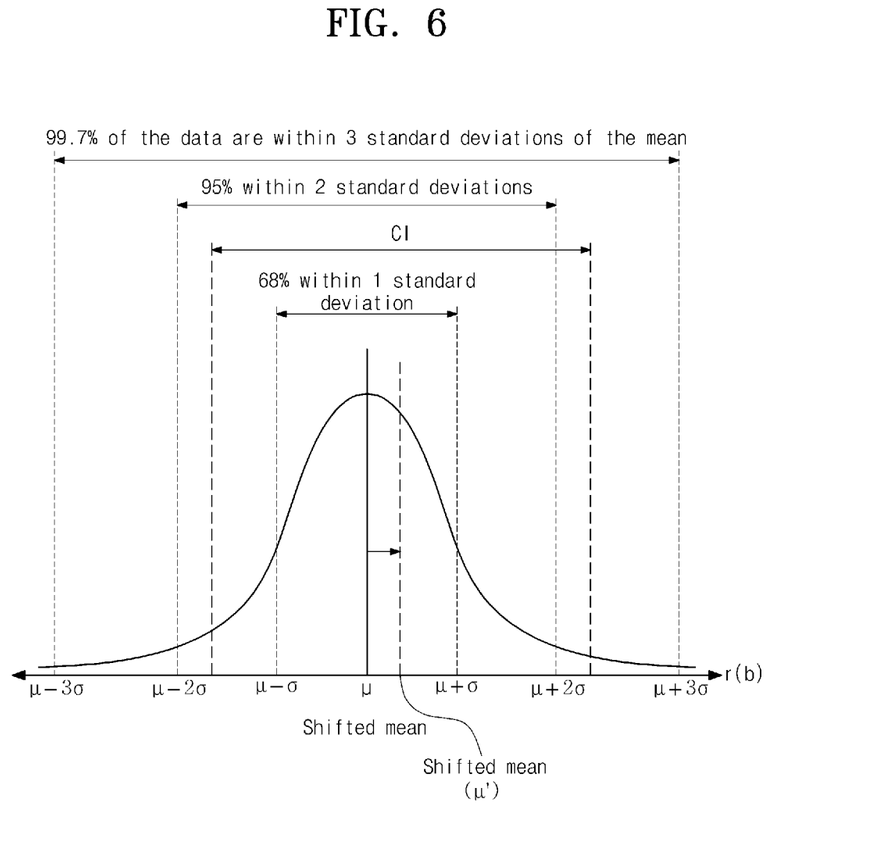
FIG. 6 is a distribution diagram about patches illustrating a mean shift operation described in FIG. 5.

FIG. 6 is a distribution diagram further illustrating the mean shift operation described in FIG. 5. Referring to FIG. 6, the block variance ($\sigma^2$) for each of the patches included in a gray zone may be used as a weight. Moreover, a mean value μ calculated without using the block variance ($\sigma^2$) may be shifted to the shifted mean μ' using the block variance ($\sigma^2$). This will be described in more detail below.

A normal distribution diagram about a normalized r(b) color space may have a Gaussian distribution illustrated in FIG. 6. That is, normalized 'r' (i.e., R/(R+G+B)) or 'b' (i.e., B/(R+G+B)) points about patches included in a gray zone may be formed in the form of the normal distribution. Here, a mean value μ or a standard deviation σ may be one of an 'r' component or a 'b' component.

However, the shifted mean value to which the block variance ($\sigma^2$) about normalized color components of patches included in the gray zone is applied as a weight may be changed. Even though patches are included in the gray zone, patches affected by a color which dominates a color in an image may, in fact, exist. An additional patch selection may be possible through a mean shift operation in which a small weight is applied to the patches. Patches, which is not determined as not being a gray color, from among each of blocks may be additionally excluded through the mean shift operation and the patch selection in a corresponding confidence.

Figure 7:
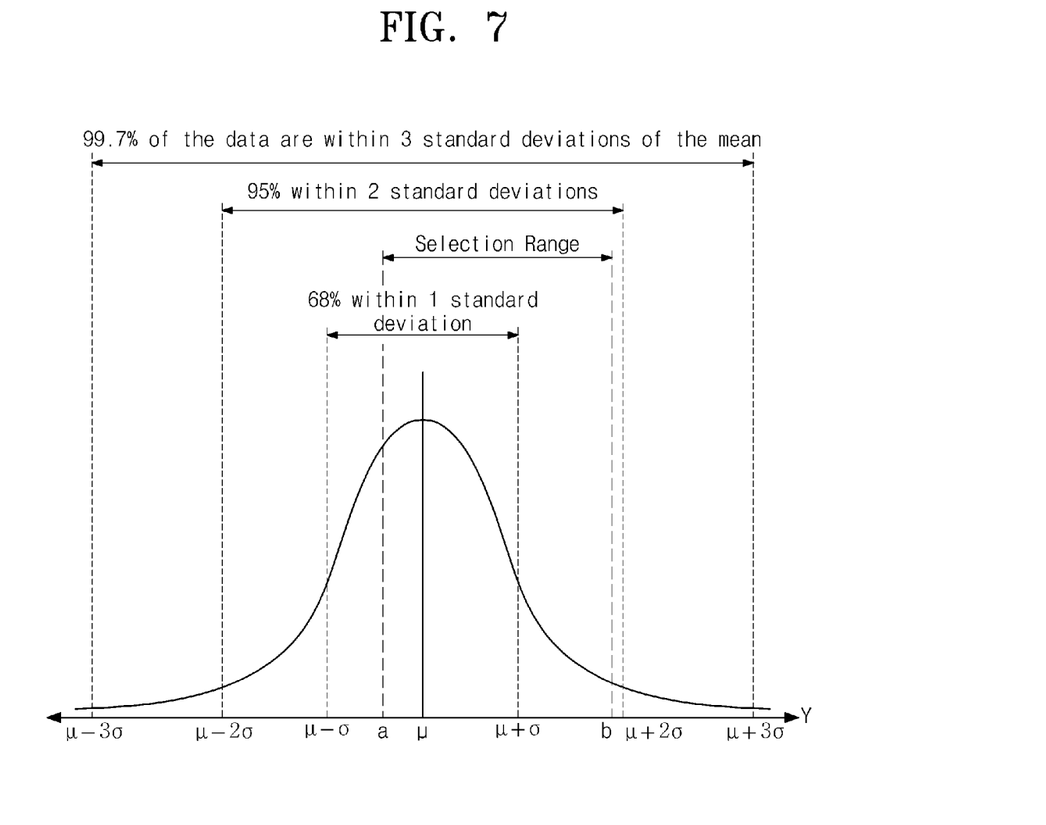
FIG. 7 is a distribution diagram illustrating a statistical processing at a luminance Y domain about patches described in FIG. 5.

FIG. 7 is a distribution diagram further illustrating the statistical processing at a luminance Y domain for the patches described in FIG. 5. Referring to FIG. 7, a distance between a black color and a white color with the mean value μ as the center may be differently applied to patches selected at the luminance Y domain and the patches may be selected.

Generally, it is understood from a spectrum of the luminance Y about a change of an illuminant that a change of a white component is great than that of a black component. Accordingly, the possibility that a white point is selected may be high by selecting patches of which a white component is great with the mean value μ at the luminance Y domain as the center. A range about patches selected to provide a great allowance to a white side with the mean value μ at the luminance Y domain as the center may be determined as 'a' and 'b'. Here, a distance (i.e., μ–a) between a point 'a' of a black side and a mean value μ may be set to be shorter than a distance (i.e., b–μ) between a point 'b' of a white side and a mean value μ.

Figure 8:
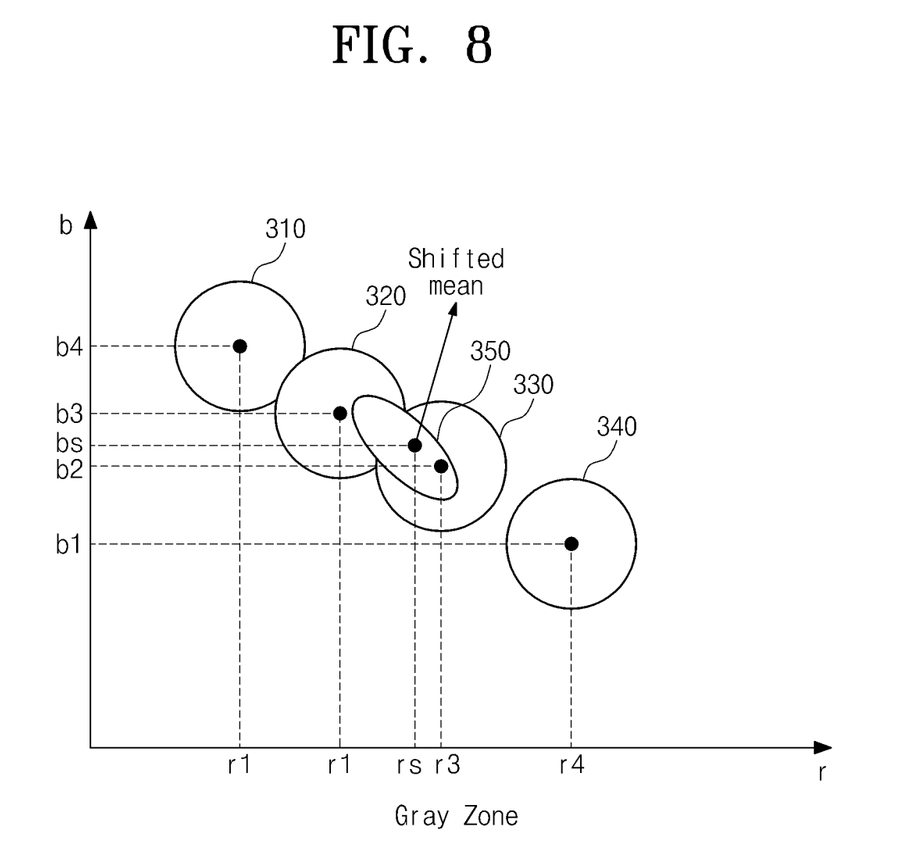
FIG. 8 is a graph illustrating a distribution in a gray zone about patches selected by a mean shift operation at a color space and a statistical method at a luminance Y domain.

FIG. 8 is a graph illustrating a distribution in a gray zone for patches selected by a mean shift operation at a color space and a statistical method at a luminance Y domain. Referring to FIG. 8, patches selected through a mean shift operation in each of a color space and the luminance Y domain and a statistics operation providing an allowance range to a white component may be displayed as first final candidates 350. Here, the gray zone 310, 320, 330, and 340 may correspond to circuits having a radius Di with anchor points (rm, bn) as the center described in FIG. 4, respectively.

Compared with a mean value point (not shown) about the gray zones 310, 320, 330, and 340, a mean value (rs, bs) about patches selected At step S136 of FIG. 5 may be a points shifted by a specific distance. Moreover, a boundary of first final candidates 350 may be overlapped with each of the gray zones 320 and 330. The first final candidates 350 selected herein are exemplified. However, the scope of the inventive concept may not be limited thereto. For example, the first final candidates 350 may be included in the gray zones 310, 320, 330, and 340 as various forms.

The image signal processor 130 may calculate a first RGB gain based on a shifted mean value (rs, bs) determined by applying a statistical method. That is, a gain about each of components may be determined such that a component of each of R, G, and B of an image has the same magnitude with reference to a ratio of RGB components corresponding to the mean value (rs, bs). However, the image signal processor 130 may not promptly apply the determined first RGB gain to corresponding image data. The final RGB gain may be determined by combining the first RGB gain with the second RGB gain generated after an additional selection operation in a shrunken gray zone to be described below.

Figure 9:
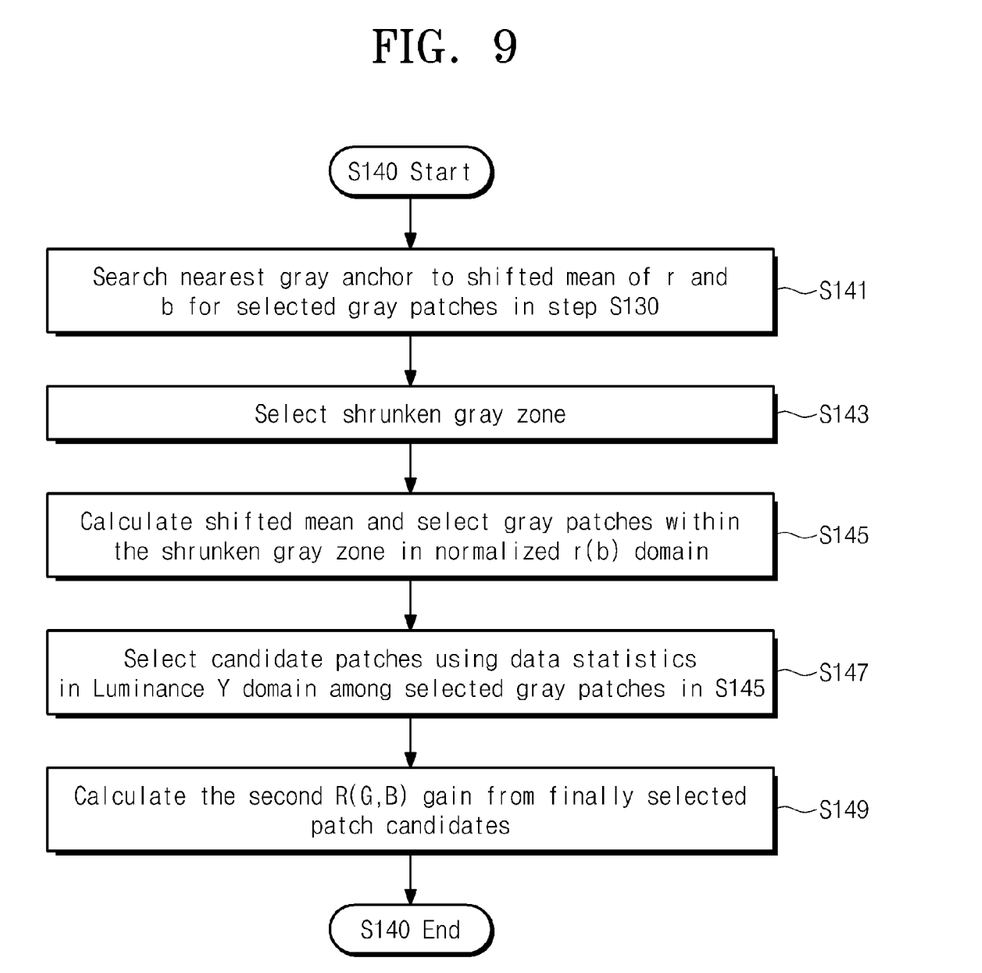
FIG. 9 is a flowchart for describing step S140 of FIG. 2.

FIG. 9 is a flowchart further describing the step of calculating the second R(G, B) gain for the gray zone patched as described in step S140 of the method of FIG. 2. Referring to FIG. 9, a white point may be extracted by performing a statistical mean shift operation and making the selection at the luminance Y domain, with respect to patches included in the first final candidates 350 described with reference to FIG. 8.

An anchor point (rf, bf) which is closest to a mean value (rs, bs) of the first final candidates 350 in a normalized color space may be selected (S141). That is, an anchor point, which is closest to a mean value (rs, bs), from among anchor points respectively corresponding to the gray zones 310, 320, 330, and 340. The determination of the anchor point may be easily determined through the simple calculation of a distance.

A unit gray zone corresponding to the selected anchor point (rf, bf) may be selected (S143). Here, the selected unit gray zone functionally becomes the shrunken gray zone. For example, the shrunken gray zone may be determined as a gray zone 330 corresponding to the anchor point which is closest to a mean value (rs, bs). In such cases, patches, which are included in the gray zone 320, from among the first final candidates 350 may be excluded.

White patch candidates 360 of a range, which is overlapped with the shrunken gray zone 330, from among the first final candidates 350 may be selected (S145). Moreover, the mean shift operation may be performed at the normalized color space r(b) coordinate about the white patch candidates 360. A mean value (μ) may exist in the normalized color space about patches included in the white patch candidates 360. However, patches, which are, in fact, affected by a color of an object which has a dominant color of an image or a relatively large size, from among patches included in the shrunken gray zone may exist. The patches may be included in the gray zone but, in fact, may be patches including a color. Patches of the white patch candidates 360 may belong to a block of which the block variance ($\sigma^2$) is relatively great, and patches thereof may belong to a block of which the block variance ($\sigma^2$) is relatively small. Accordingly, a mean about patches may be again obtained by applying a great weight to patches, of which the block variance ($\sigma^2$) is great, from among patches included in the shrunken gray zone and applying a small weight to patches, of which the block variance ($\sigma^2$) is small, from among the patches included in the shrunken gray zone. The mean calculated by applying the weight may correspond to a shifted mean (μ'). Patch candidates based on the shifted mean (μ") may be re-selected. That is, patches corresponding to a confidential (e.g., 95%) interval with the shifted mean (μ') as the center may be selected.

Then, a selection may be made in the luminance Y domain about each of patches selected at step S145 (S147). Generally, it is understood from a spectrum of the luminance Y about a change of an illuminant that a change of a white component is great than that of a black component. Accordingly, patches of which the white component is great with a mean (μ) as the center may be much selected. At this step, the selected white patch candidates may be referred to as "second final candidates".

A gain for an auto white balance at a color space may be calculated with reference to the second final candidates selected at the luminance Y domain (S149). That is, a gain about color components for adjustment may be calculated with reference to mean RGB values about patches selected at step S147 such that a ratio of color components is identically maintained. In certain embodiments of the inventive concept, the calculated gain may be a second RGB gain.

Above, a method of selecting the second final candidate with respect to white patch candidates at the shrunken gray zone is described. When the second RGB gain extracted through the second final candidates and the first RGB gain previously extracted through the first final candidates are combined, a final RGB gain according to an embodiment of the inventive concept may be calculated.

Figure 10:
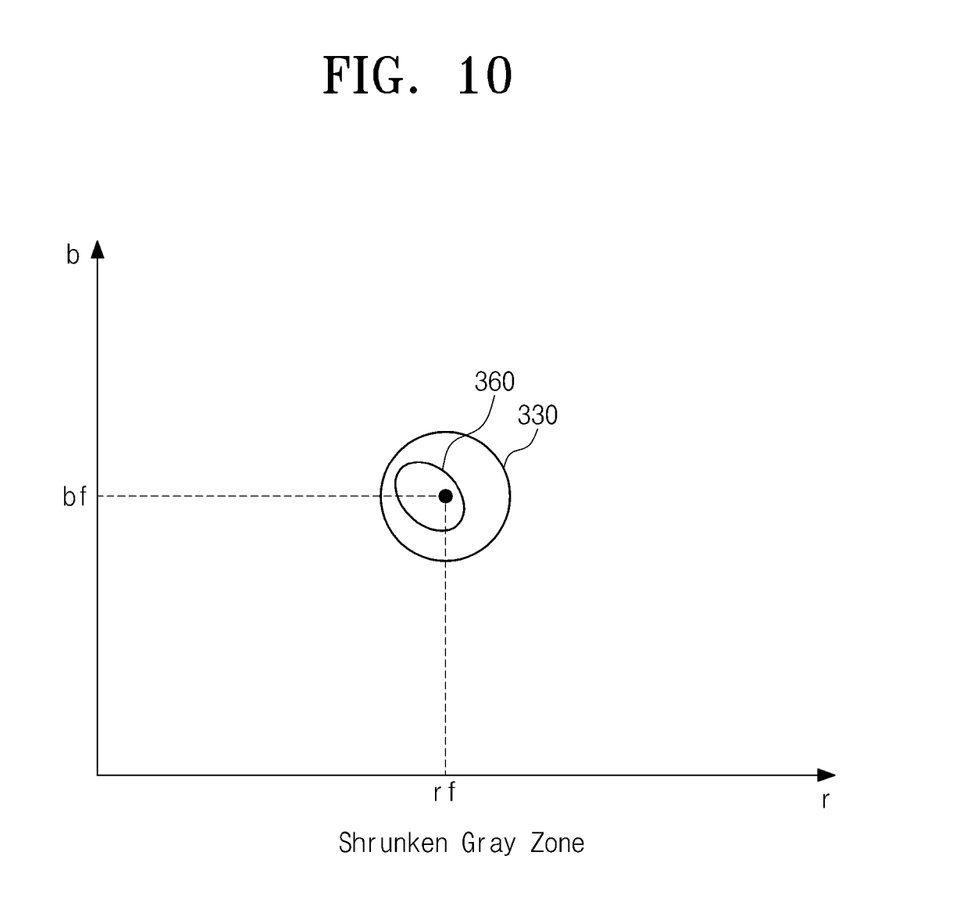
FIG. 10 is a graph illustrating a shrunken gray zone according to an embodiment of the inventive concept.

FIG. 10 is a graph illustrating a shrunken gray zone according to an embodiment of the inventive concept. Referring to FIG. 10, a shrunken gray zone may be selected as a unit gray zone corresponding to one of a plurality of anchor points.

At steps S141 and S143 of FIG. 9, an anchor point (rf, bf) which is closest to a mean value (rs, bs) of the first final candidates 350 may be selected in a normalized color space. That is, an anchor point, which is closest to a mean value (rs, bs), from among anchor points respectively corresponding to the gray zones 310, 320, 330, and 340. Moreover, a unit gray zone 330 corresponding to the selected anchor point (rf, bf) may be selected. For example, the shrunken gray zone may be determined as a gray zone 330 corresponding to the anchor point which is closest to a mean value (rs, bs) of the first final candidates 350. At the case, patches, which are included in the gray zone 320, from among the first final candidates 350 may be excluded from a statistical operation.

Above, a hybrid auto white balancing approach according to an embodiment of the inventive concept is described. An embodiment of the inventive concept is exemplified as the RGB color space and the normalized r(b) color space are mainly used to described a characteristic of the inventive concept. However, the scope of the inventive concept is not limited thereto. For example, a color difference space (UV) at YUV signal method may be used as a white balancing operation according to an embodiment of the inventive concept.

Figure 11:
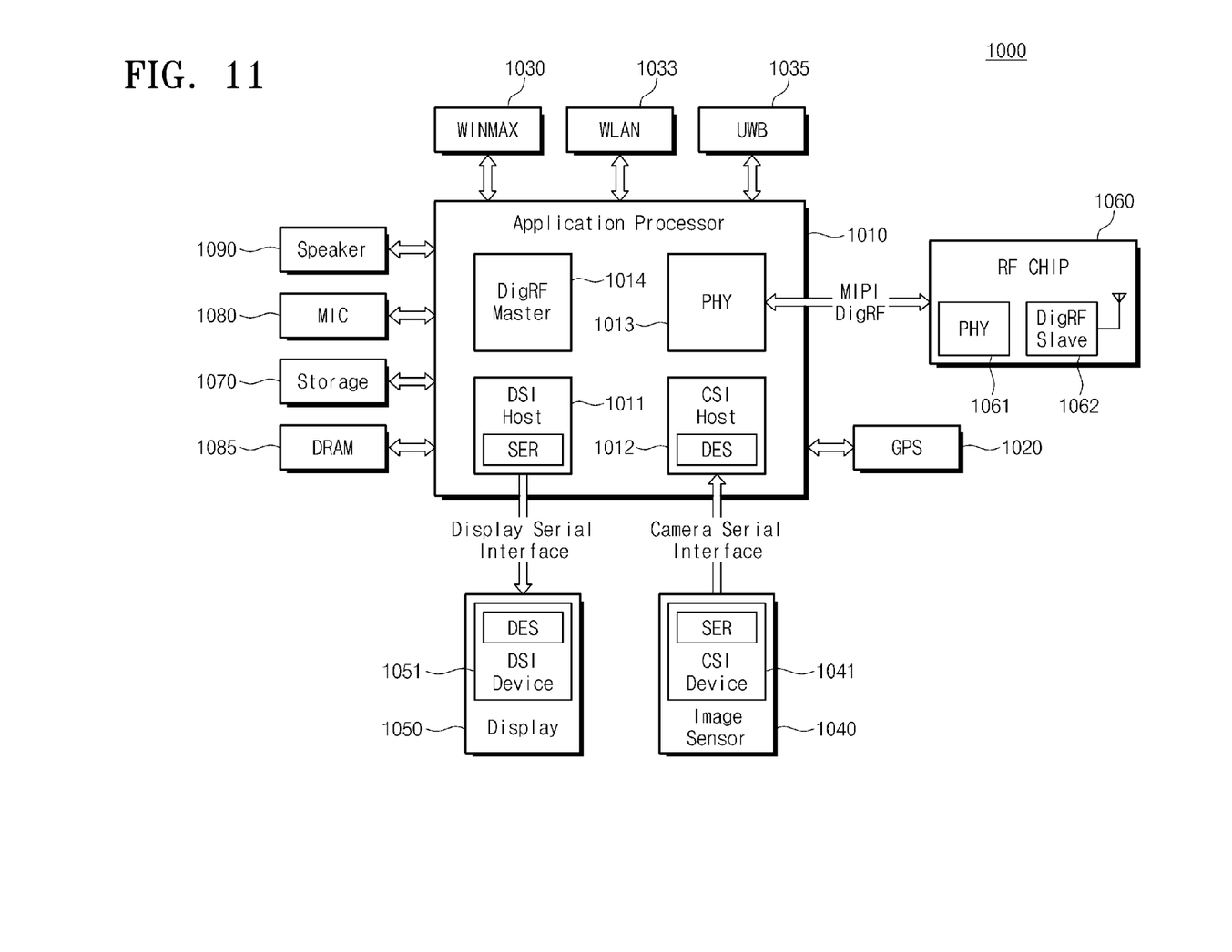
FIG. 11 is a block diagram illustrating an electronic system making a hybrid auto white balance according to an embodiment of the inventive concept.

FIG. 11 is a block diagram illustrating an electronic system including an image sensor according to an embodiment of the inventive concept. Referring to FIG. 11, an electronic system 1000 may be implemented with a data processing device, which uses or supports a mobile industry processor interface (MIPI), such as a mobile phone, a portable digital assistant (PDA), a personal media player (PMP), or a smart phone. The electronic system 1000 may include an application processor 1010, an image sensor 1040, and a display 1050.

A camera serial interface (CSI) host 1012 implemented in the application processor 1010 may serially communicate with a CSI device 1041 of the image sensor 1040 through a CSI. At this time, an optical deserializer DES may be implemented in the CSI host 1012, and an optical serializer SER may be implemented in the CSI device 1041. Moreover, the application processor 1010 may include an image signal processor (ISP) making an auto white balance according to an embodiment of the inventive concept.

A display serial interface (DSI) host 1011 implemented in the application processor 1010 may serially communicate with a DSI device 1051 of the display 1050 through a DSI. At this time, an optical serializer SER may be implemented in the DSI host 1011, and an optical deserializer DES may be implemented in the DSI device 1051.

The electronic system 1000 may include a radio frequency (RF) chip 1060 for communicating with the application processor 1010. For example, the physical layer 1061 of the RF chip 1060 and the physical layer 1013 of the application processor 1010 may exchange data with each other through DigRF interface.

The electronic system 1000 may further include a global positioning system (GPS) 1020, storage 1070, a microphone 1080, a dynamic random access memory (DRAM) 1085, and a speaker 1090. The electronic system 1000 may communicate using a worldwide interoperability for microwave access (WiMAX) 1030, a wireless local area network (WLAN) 1033, and an ultra-wideband (UWB) 1035, or the like.

According to an embodiment of the inventive concept, an image device may be implemented to provide an auto white balancing function which makes it possible to significantly reduce a complexity of an algorithm and to have accuracy.

It will be understood that various modifications and other equivalent embodiments are possible from this point by those skilled in the art. The scope of the present invention is defined by the appended claims.

What is claimed is:

1. An auto white balancing method for image data divided into a plurality of blocks and associated with an image detected by an image sensor, the method comprising:
calculating a corresponding block variance for each one of the plurality of blocks;
indicating selected blocks from among the plurality of blocks having a block variation higher than a variance reference value;
selecting patches included in a gray zone defined at a color space from among a plurality of patches included in one of the selected blocks;
applying a corresponding block variance as a weight to the selected patches, adjusting a first mean value at the color space, and selecting first patch candidates belonging to a first distribution at a luminance domain from among the selected patches selected with reference to an adjusted first mean value;
selecting a shrunken gray zone corresponding to one anchor point at the gray zone and selecting second patch candidates belonging to a second distribution at a color space and a luminance domain from among patches included in the shrunken gray zone; and
calculating a final gain for the image data by combining the first RGB gain and second RGB gain, as respectively extracted from the first patch candidates and the second patch candidates.

2. The method of claim 1, wherein the gray zone comprises a plurality of anchor points associated with the image sensor at a plurality of color temperatures in the color space, and
the gray zone is defined by a radius extending from a center associated with the anchor points.

3. The method of claim 1, wherein the color space is defined as a normalized value of each of a red color component value and a blue color component value about a sum of the red color component, a green color component, and the blue color component.

4. The method of claim 1, wherein the color space is defined as normalized values generated by dividing each of a red color component value and a blue color component value by a green color component value.

5. The method of claim 1, wherein the applying of the corresponding block variance comprises:
applying a weight for a block corresponding to a color component of each of patches included in the gray zone to calculate the second mean value;
selecting patches included in a confidence range based on the second mean value from among patches included in the gray zone; and
selecting patches included in a luminance distribution range from among patches included in the confidence range as the first patch candidates.

6. The method of claim 5, wherein the luminance distribution range is set such that a range in a white direction about a mean value of a luminance is wider than a range in a black direction thereof.

7. The method of claim 1, wherein the selecting of the shrunken gray zone comprises:
selecting an anchor point closest to a mean value of the first patch candidates of the gray zone;
selecting a gray zone corresponding to a unit circle with the anchor point as a center from among the gray zone as the shrunken gray zone;
applying a weight associated with a block to patches included in the shrunken gray zone to calculate a third mean value;
selecting patches included in a confidence range based on the third mean value from among patches included in the shrunken gray zone; and
selecting patches included in a luminance distribution range from among patches included in the confidence range as the second patch candidate.

8. The method of claim 7, wherein the shrunken gray zone corresponds to a plurality of patches included within a radius about an anchor point closest to the mean value.

9. The method of claim 1, wherein the calculating of the final gain comprises:
applying a block variance to which the first patch candidates belong to the first RGB gain as a weight to calculate a first gain;
applying a block variance to which the second patch candidates belong to the second RGB gain as a weight to calculate a second gain; and
adding the first gain to the second gain to calculate the final gain.

10. An image processing device, comprising:
an image sensor configured to sense an image and output the sensed image as image data; and
an image signal processor configured to divide the image data into a plurality of blocks, select blocks having a block variance at a color space higher than a reference variance value, select patches included in a gray zone defined at the color space from among patches included in one of the selected blocks, calculate a first RGB gain by performing a mean shift with respect to patches included in the gray zone at the color space and making a confidence range selection at a luminance domain, and calculate a second RGB gain by performing the mean shift about patches included in a shrunken gray zone at the color space and making the confidence range selection at the luminance domain,
wherein the image signal processor combines the first RGB gain and second RGB gain to provide a final gain as a gain for a color component of an auto white balancing of the image data.

11. The image processing device of claim 10, wherein the gray zone corresponds to a color space included in a radius surrounding at least one anchor point to which a characteristic of the image sensor is applied corresponding to at least one color temperature.

12. The image processing device of claim 11, wherein the image signal processor applies a block variance at the color space to patches of the gray zone as a weight and performs a mean shift using the weight.

13. The image processing device of claim 12, wherein the image signal processor selects a patch of a luminance range in a luminance domain from among patches selected based on the shifted mean and calculates the first RGB gain using the selected patch, and
the luminance range is provided such that a range in a white direction is greater than a range in a black direction based on a mean value of a luminance condition for the selected patches.

14. The image processing device of claim 10, wherein the shrunken gray zone corresponds to a color region of patches disposed in a radius surrounding an anchor point closest to a mean value of patches used to calculate the first RGB gain from among the at least one anchor points.

15. The image processing device of claim 10, wherein the image signal processor comprises a hybrid auto white balancing module configured to calculate the first RGB gain, second RGB gain and final RGB gain.

16. An auto white balancing method for image data generated by an image processing device, the method comprising:
- dividing the image data into a plurality of blocks and calculating a block variance for each one of the plurality of blocks at a color space;
- selecting blocks having a block variance exceeding a reference value from among the plurality of blocks and further selecting blocks included in a gray zone from among the selected blocks;
- selecting first candidate units having a first confidence at the color space or at a luminance domain from among the selected blocks;
- selecting image units included in a shrunken gray zone smaller than the gray zone from among the first candidate units; and
- selecting second candidate units having a second confidence at the color space or at the luminance domain from among the selected image units,
- wherein the selecting of the first candidate units and the selecting of the second candidate units each comprises performing a mean shift operation using a corresponding block variance as a weight.

17. The method of claim 16, wherein the selecting of the first candidate units comprises:
- performing a mean shift operation by applying the corresponding block variance for blocks included in the gray zone;
- selecting white image units having the first confidence based on a mean provided as a result of the mean shift operation; and
- providing the first candidate units by selecting image units within a luminance range from among the white image units.

18. The method of claim 16, wherein at least one of the gray zone and the shrunken gray zone is mapped to ranges corresponding to a specific color temperature at a normalized color space for each one of the plurality of blocks.

19. The method of claim 16, further comprising:
- calculating a first gain and a second gain from the first candidate units and the second candidate units, respectively.

20. The method of claim 19, further comprising:
- applying the corresponding block variance to the first gain and the second gain as a weight and determining a color space gain for the image using the weight.

* * * * *